United States Patent
Oku et al.

(10) Patent No.: US 10,128,514 B2
(45) Date of Patent: Nov. 13, 2018

(54) FUEL CELL METAL SEPARATOR STRUCTURE, FUEL CELL USING THE SEPARATOR STRUCTURE AND FUEL CELL STACK

(71) Applicant: NISSAN MOTOR CO., LTD., Yokohama-shi, Kanagawa (JP)

(72) Inventors: Takanori Oku, Kanagawa (JP); Shigemasa Kuwata, Kanagawa (JP)

(73) Assignee: NISSAN MOTOR CO., LTD., Yokohama-Shi (JP)

( * ) Notice: Subject to any disclaimer, the term of this patent is extended or adjusted under 35 U.S.C. 154(b) by 0 days.

(21) Appl. No.: 15/578,108

(22) PCT Filed: Jun. 2, 2016

(86) PCT No.: PCT/JP2016/066497
§ 371 (c)(1),
(2) Date: Nov. 29, 2017

(87) PCT Pub. No.: WO2016/195045
PCT Pub. Date: Dec. 8, 2016

(65) Prior Publication Data
US 2018/0159147 A1 Jun. 7, 2018

(30) Foreign Application Priority Data
Jun. 3, 2015 (JP) .................. 2015-113077

(51) Int. Cl.
*H01M 8/2483* (2016.01)
*H01M 8/0273* (2016.01)
(Continued)

(52) U.S. Cl.
CPC ............ *H01M 8/026* (2013.01); *H01M 8/02* (2013.01); *H01M 8/0202* (2013.01);
(Continued)

(58) Field of Classification Search
CPC .................... H01M 8/2483; H01M 8/0273
See application file for complete search history.

(56) References Cited

U.S. PATENT DOCUMENTS 7,951,510 B2   5/2011   Ji et al.
9,525,188 B2   12/2016  Nonoyama
(Continued)

FOREIGN PATENT DOCUMENTS

CN   101443938 A   5/2009
CN   103168382 A   6/2013
(Continued)

*Primary Examiner* — Olatunji Godo
(74) *Attorney, Agent, or Firm* — Foley & Lardner LLP (57) ABSTRACT

A fuel cell metal separator structure includes a first separator in contact with a first membrane electrode assembly and a second separator in contact with a second membrane electrode assembly.
In the stacking direction of the first separator and the second separator and the membrane electrode assemblies,
in an reaction area formed between the two membrane electrode assemblies, an electrically conductive member is put between the first separator and the second separator, and in the sealing portion on a periphery of the membrane electrode assembly, the first separator and second separator are in direct contact with each other so that a space for sealing is expanded due to the increased depth of the sealing grooves.

13 Claims, 9 Drawing Sheets

(51) Int. Cl.
    *H01M 8/026*      (2016.01)
    *H01M 8/02*      (2016.01)
    *H01M 8/0202*      (2016.01)
    *H01M 8/0271*      (2016.01)
    *H01M 8/0206*      (2016.01)
    *H01M 8/0267*      (2016.01)
    *H01M 8/10*      (2016.01)

(52) U.S. Cl.
    CPC ....... *H01M 8/0206* (2013.01); *H01M 8/0267* (2013.01); *H01M 8/0271* (2013.01); *H01M 8/0273* (2013.01); *H01M 8/10* (2013.01)

(56) References Cited

U.S. PATENT DOCUMENTS

| | | |
|---|---|---|
| 9,660,276 B2 | 5/2017 | Sugiura et al. |
| 2002/0146601 A1 | 10/2002 | Sugiura et al. |
| 2006/0099481 A1 | 5/2006 | Ji et al. |
| 2007/0184327 A1 | 8/2007 | Ishioka et al. |
| 2013/0209909 A1 | 8/2013 | Sugiura et al. |

FOREIGN PATENT DOCUMENTS

| | | |
|---|---|---|
| EP | 2 916 376 A1 | 9/2015 |
| FR | 2896623 | 7/2007 |
| JP | 2002-260689 A | 9/2002 |
| JP | 2006-156216 A | 6/2006 |
| JP | 2009-117138 A | 5/2009 |
| JP | 2010-3508 A | 1/2010 |
| JP | 2011-146247 A | 7/2011 |
| JP | 2014-112565 A | 6/2014 |
| WO | WO-2014/068854 | 5/2014 |

FUEL CELL METAL SEPARATOR STRUCTURE, FUEL CELL USING THE SEPARATOR STRUCTURE AND FUEL CELL STACK

TECHNICAL FIELD

The present invention relates to a metal separator structure used in a fuel cell. In more detail, the present invention relates to a fuel cell metal separator structure that ensures the sealing robustness even when a thin gas diffusion layer is used or a thin groove gas channel is employed, a fuel cell using the separator structure, and a fuel cell stack.

BACKGROUND ART

A fuel cell stack is constituted of single cells stacked, and each of the single cells includes a membrane electrode assembly and a pair of separators with corrugated shapes that sandwiches the membrane electrode assembly. Further, the single cells are stacked between two end plates and are added a fastening load of a fastening bolts and/or a casing in a stacking direction to form the fuel cell stack.

A gas channel is formed between the membrane electrode assembly and a separator of the pair of the separators along a reaction surface, and a cooling medium channel is formed between two separators lying next to each other. Further, a sealing member is provided on a periphery of the membrane electrode assembly to prevent a leakage of gas or the like.

The Patent Document 1 of JP 2011-146247 A discloses that while a surface of an electrode layer of each of the single cells is subject to pressure unevenly, a terminal voltage is sometimes reduced due to an increase of a contact resistance, and an abnormality of fuel cell single cells can therefore be detected by means of strain gauges provided on the surfaces of metal separators before occurrence of performance deterioration or fluid leakage.

SUMMARY OF INVENTION

Technical Problem

While a fuel cell stack described in Patent Document 1 can detect an abnormality of fuel cell single cells, it cannot prevent the fuel cell from getting an abnormal condition.

In automotive fuel cells, the thickness of the gas diffusion layers formed on the surface of the membrane electrode assembly is reduced in order to improve diffusion of reaction gas, and the gas channels are formed into shallow grooves in order to increase the flow rate of the reaction gas and improve water discharge from the gas channels, which are made for achieving higher performance of the fuel cells.

As the gas diffusion layers are thinner and the gas channels are shallower, the robustness of such fuel cells is decreased due to a narrowed space for sealing, which poses a risk of leakage of the reaction gas or the like from the fuel cells. That is, with a decrease in height of the space for sealing in which a sealing member is disposed, the free length of the sealing member, i.e. the squeeze allowance of the sealing member, is decreased. This results in an increased unevenness of the compression ratio of the sealing member, and the sealing property is thus degraded. Therefore, it is difficult to achieve both high performance and reliability in fuel cells.

The present invention has been made in view of such problems with the related art, and an object thereof is to provide a fuel cell metal separator structure that enables achieving both high performance and reliability of the fuel cell, a fuel cell using the separator structure and a fuel cell stack.

Solution to Problem

As a result of diligent studies to achieve the above object, the present inventors have found that an electrically conductive spacer that is put between adjacent corrugated metal separators of stacked fuel cells enables both employing thinner gas diffusion layer and shallower gas channels and ensuring a space for sealing, and the above-described object can thereby be achieved. The present invention has been thus completed.

That is, a fuel cell metal separator structure of the present invention includes: a first separator in contact with a first membrane electrode assembly of two membrane electrode assemblies; and a second separator in contact with a second membrane electrode assembly of the two membrane electrode assemblies,
wherein gas channels are formed between the first separator and the first membrane electrode assembly and between the second separator and the second membrane electrode assembly, and a cooling medium channel is formed between the first separator and the second separator, and
in a stacking direction of the first separator and the second separator and the membrane electrode assemblies, on a periphery of the membrane electrode assemblies, the first separator and the second separator are in direct contact with each other so as to form sealing grooves, and in a reaction area sandwiched between the two electrode assemblies, an electrically conductive member is put between the first separator and the second separator, and both of the first separator and the second separator are in contact with the electrically conductive member.

A fuel cell stack of the present invention includes the above-described fuel cell metal separator structure and a membrane electrode assembly that are alternately stacked.

A fuel cell of the present invention includes two metal separators, and a membrane electrode assembly that is put between the two metal separators, wherein gas channels are formed between the membrane electrode assembly and each of the two metal separators, cooling medium channels are formed between the metal separators and metal separators of adjacent fuel cells, and
in the stacking direction of the fuel cell, on a periphery of the membrane electrode assembly, the two metal separators are in direct contact with metal separators of respective adjacent fuel cells so as to form sealing grooves, and in a reaction areas sandwiching the membrane electrode assembly, electrically conductive members are put between the metal separators and metal separators of adjacent fuel cells, and the metal separators are in contact with the electrically conductive members.

Advantageous Effects of Invention

In the present invention, between adjacent metal separators of stacked single cells, the electrically conductive member is put as a spacer in the reaction area while the electrically conductive spacer is not put in the sealing portion but the adjacent corrugated metal plates are in contact with each other. This ensures a space for sealing even when the gas diffusion layers are formed so as to be thinner layers and the gas channels are formed so as to be shallower grooves. Therefore, this enables a fuel cell to achieve both high performance and reliability.

DESCRIPTION OF EMBODIMENTS

The fuel cell metal separator structure of the present invention will be described in detail.

The fuel cell metal separator structure of the present invention is used in a fuel cell stack that includes a stacked plurality of single cells, in each of which a membrane electrode assembly is put between a pair of separators. The fuel cell metal separator structure includes two separators that are disposed between two membrane electrode assemblies of adjacent single cells.

Figure 1A:
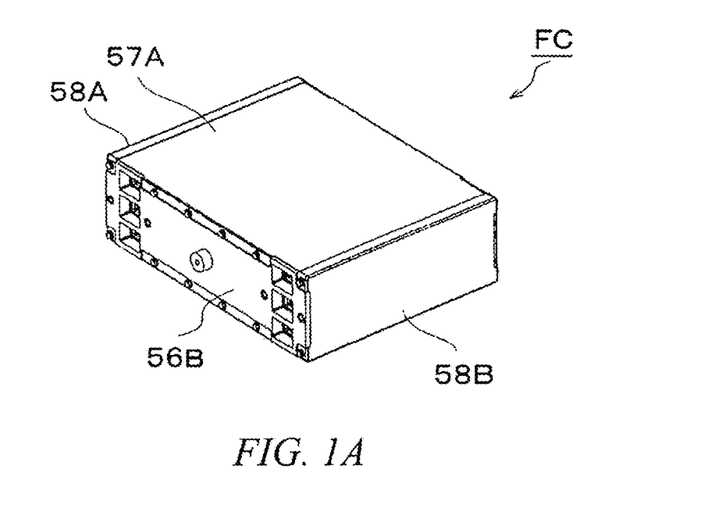
FIG. 1A is a perspective view of a fuel cell and FIG. 1B is an exploded perspective view of a fuel cell.
Figure 1B:
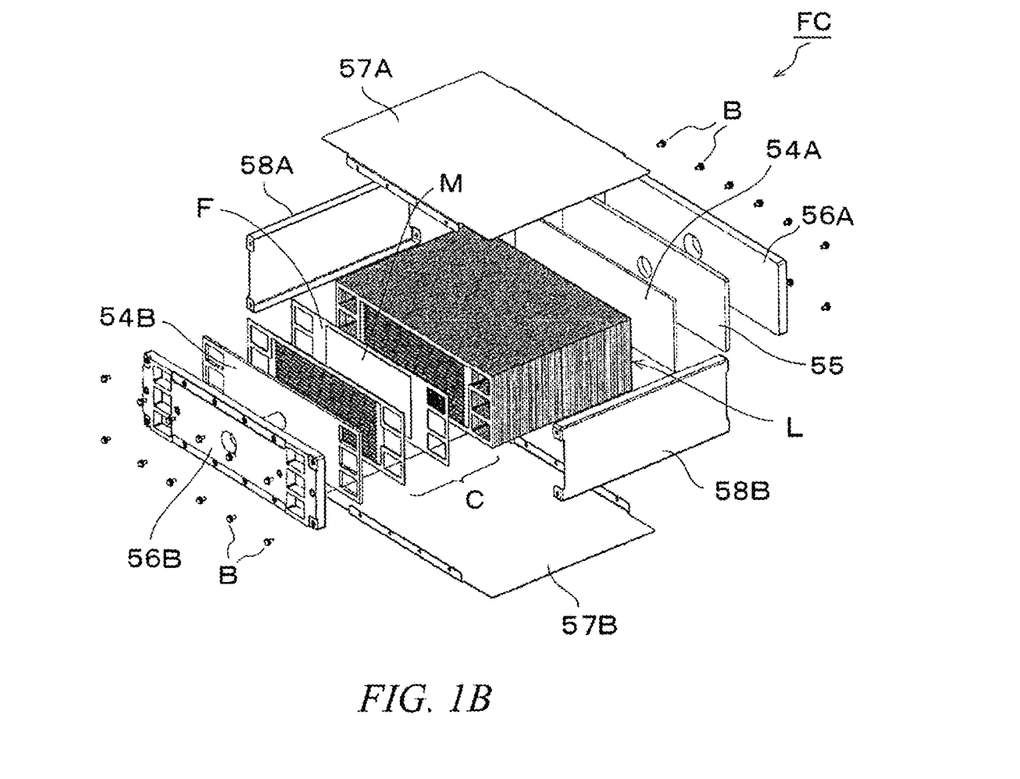

First, the fuel cell stack will be described. FIG. 1A and FIG. 1B illustrate examples of the fuel cell stack. Each of the fuel cell FC of FIG. 1A and FIG. 1B includes a stack (fuel cell stack) L in which the fuel cell metal separator structures and the membrane electrode assemblies are alternately stacked to constitute a plurality of rectangular plates of fuel cell single cells C (hereinafter referred to simply as "single cells").

The fuel cell FC includes an end plate 56A that are disposed at a first end in the stacking direction (at the right end in FIG. 1B) of the stack L via a current collector plate 54A and a spacer 55, and an end plate 56B that is disposed at a second end via a current collector plate 54B. The fuel cell FC further includes fastening plates 57A, 57B that are disposed on both faces (the upper face and underside face in FIG. 1B) of the stack L corresponding to the long sides of the single cells C, and reinforcing plates 58A, 58B that are disposed on both faces corresponding to the short sides.

In the fuel cell FC, the fastening plates 57A, 57B and the reinforcing plates 58A, 58B are each coupled to both of the end plates 56A, 56B by means of bolts B. As described above, the fuel cell FC has a case-integrated structure as illustrated in FIG. 1A, which restrains and presses the stack L in the stacking direction to apply a predetermined contact surface pressure to each of the single cells C, so that the gas sealing property, the electrical conductivity, and the like are maintained at a high level.

Figure 2:
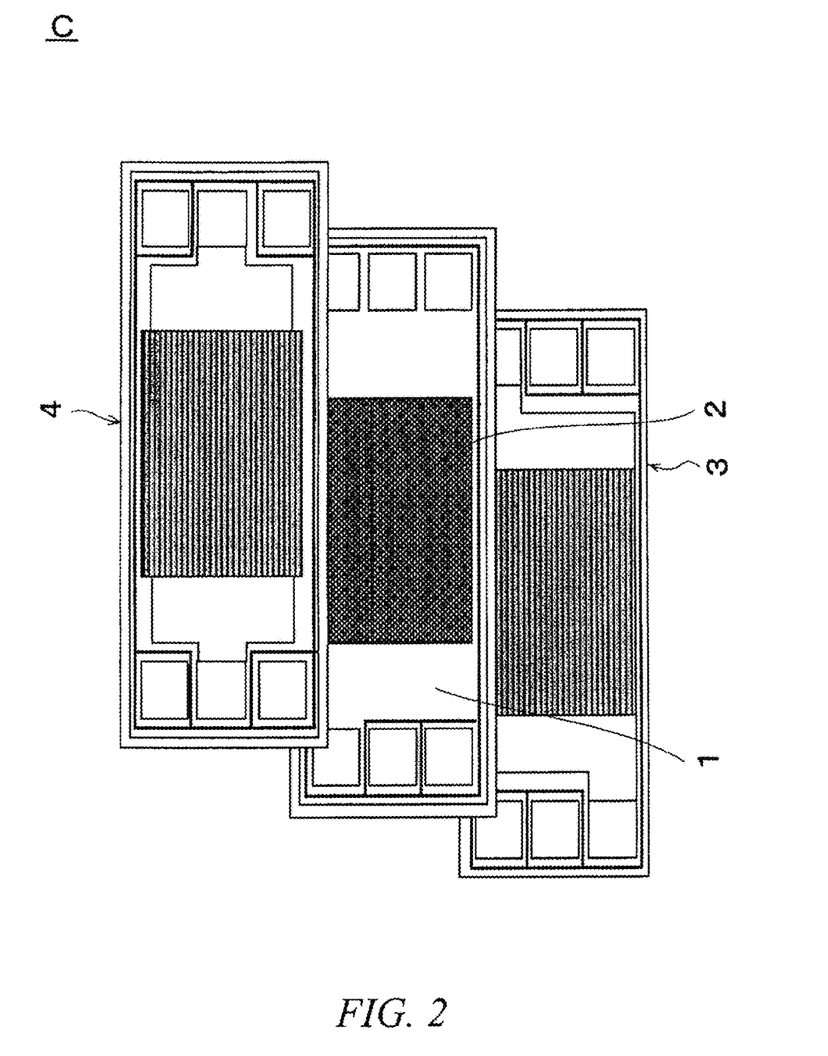
FIG. 2 is a plan view of a single cell in an exploded state.

In the fuel cell FC, each of the single cells C includes the membrane electrode assembly 2 with a peripheral frame 1, and a first separator 3 and a second separator 4 that hold the frame 1 and the membrane electrode assembly 2 between the first separator 1 and the second separator 4, as illustrated in FIG. 2.

For example, the first separator 3 and the second separator 4 are metal plates of stainless steel or the like formed by press working, which are corrugated plates that have front and back faces with mutually reversed shapes. That is, ribs and grooves on the cell inner side reversely correspond to grooves and ribs, respectively.

On the cell inner side, which is the side facing the membrane electrode assembly 2 of a reaction area, the ribs of the first separator 3 and the second separator 4 are in contact with the membrane electrode assembly 2 while the grooves form the gas channels. On the cell outer side, a cooling medium channels R are formed between the first separator 3 and the second separator 4.

On a periphery of the membrane electrode assembly 2, the first separator 3 and the second separator 4 are in direct contact with a separator of respective adjacent fuel cells so as to form sealing grooves S. The mutually opposed sealing grooves forms a sealing portion in which a sealing member is disposed to prevent gas leakage and the like.

Figure 3:
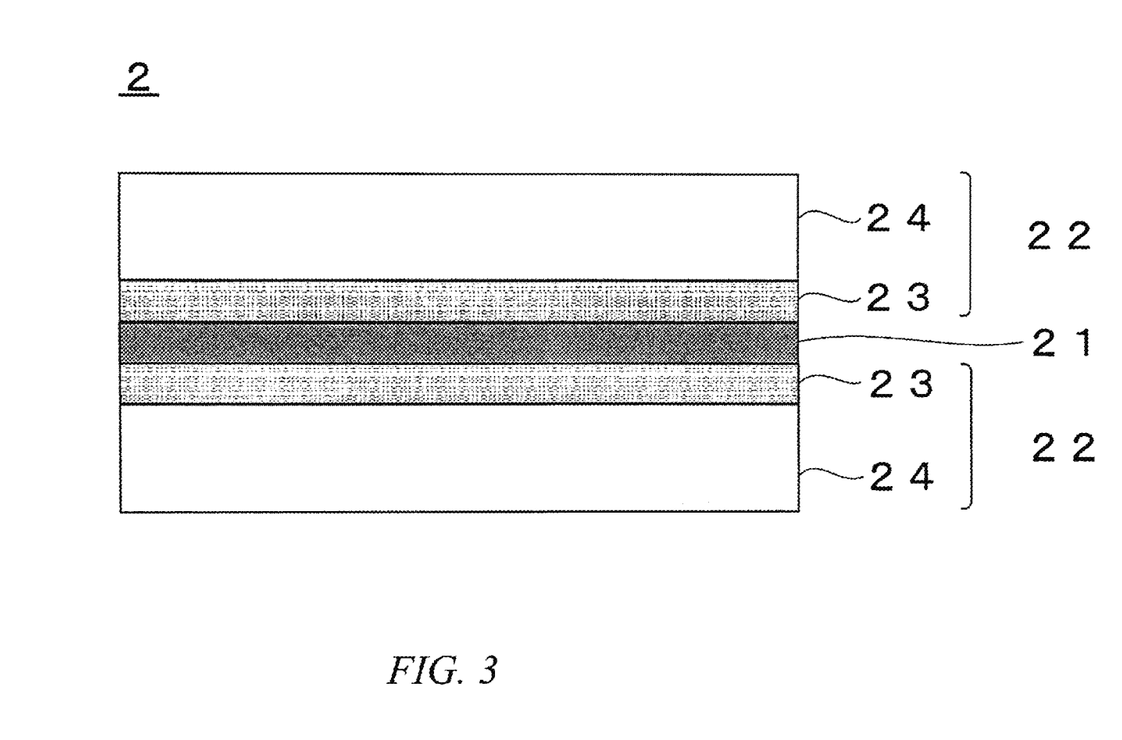
FIG. 3 is a cross sectional view of a membrane electrode assembly (MEA).

The membrane electrode assembly 2 is a so-called MEA in which an electrolyte membrane 21 of a solid polymer is put between anode and cathode electrode layers 22, and thin gas diffusion layers 24, for example, with a thickness of from 100 μm to 250 μm, are formed on the surface of catalyst layers 23, as illustrated in FIG. 3.

Figure 4A:
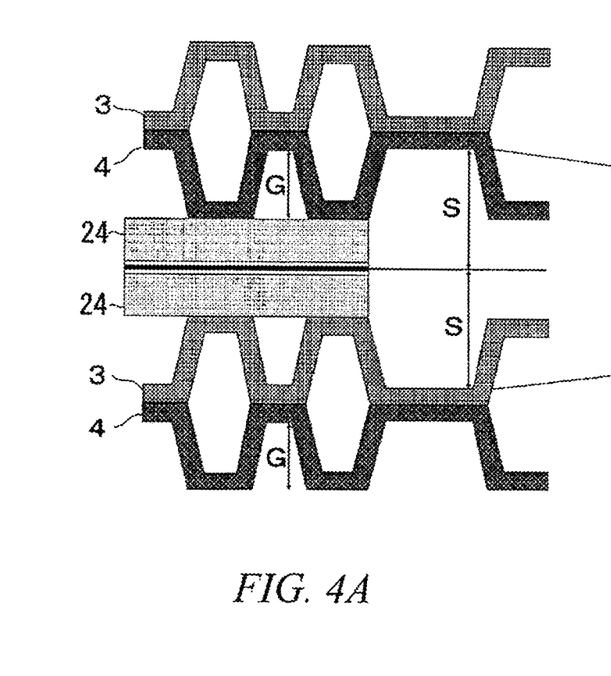
FIG. 4A and FIG. 4B illustrate the depths of sealing grooves when thin gas diffusion layers are used.
Figure 4B:
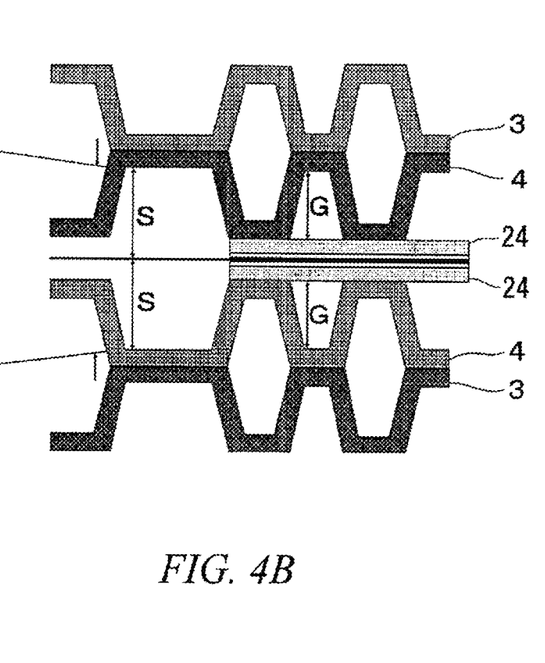

FIG. 4A and FIG. 4B are a cross sectional view of the single cells C in a stacked state. As illustrated in FIG. 4A, when the gas diffusion layers 24 of the membrane electrode assembly 2 are thick, the depth of the sealing grooves S is ensured.

However, when thin gas diffusion layers 24 are employed, the sealing grooves S become shallower as illustrated in FIG. 4B. This means the shorter free length of the sealing member, which is not shown in the figure, disposed in the sealing grooves S and causes the uneven squeeze allowance of the sealing member, which poses a risk of gas leakage and the like.

Meanwhile, the gas channels G in FIG. 4A and FIG. 4B are formed so as to be shallow grooves. When the gas channels are formed so as to be deep grooves, since the scaling grooves S is ensured to be a deep groove shape, there is no problem of degradation of the sealing property.

Figure 5A:
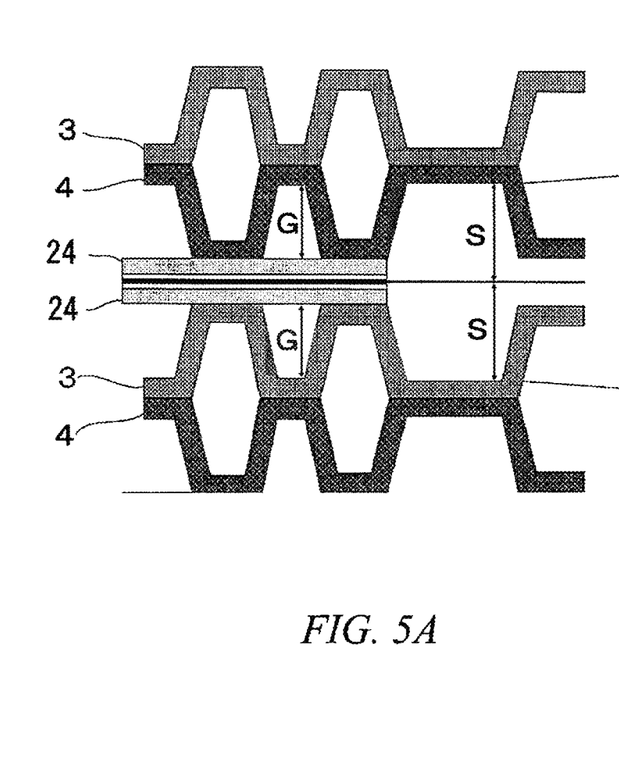
FIG. 5A and FIG. 5B illustrate the depth of sealing grooves when electrically conductive members are put.
Figure 5B:
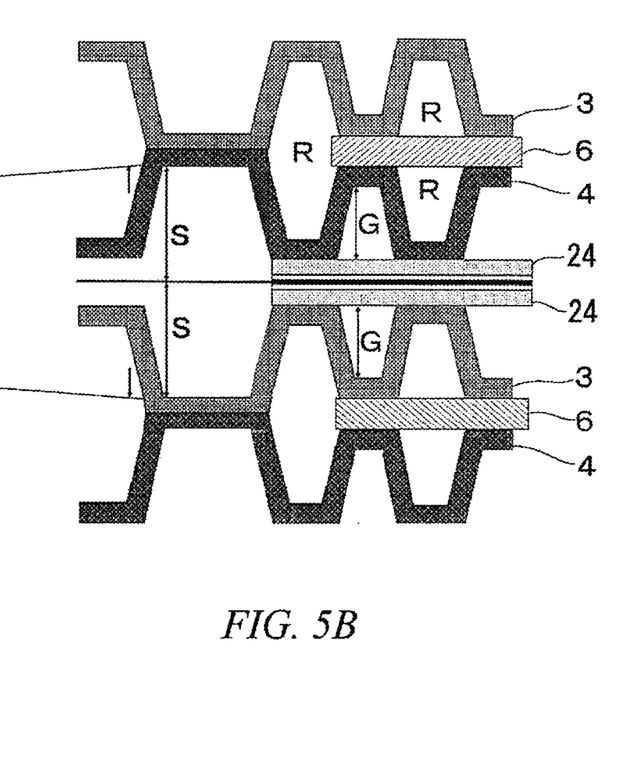

In the fuel cell metal separator structure of the present invention, an electrically conductive member 6 is put as a spacer in an area facing the membrane electrode assembly 2 in the stacking direction of the first and second separators and the membrane electrode assembly, i.e. in a reaction area between two membrane electrode assemblies on the other side from the gas channels G where the ribs of the first separator 3 and the grooves of the second separator 4 opposed to each other as illustrated in FIG. 5B.

That is, in the reaction area, the first separator 3 and the second separator 4 are in contact with each other via the electrically conductive member 6. Therefore, even when the gas diffusion layers 24 are formed so as to be thin layers and the gas channels G are also formed so as to be shallow grooves, the thickness of the single cell is ensured. Further, since the spacer is electrically conductive, the electrical conduction between the first separator 3 and the second separator 4 is also ensured.

In the sealing portion that is formed on a periphery of the membrane electrode assembly 2, the first separator 3 and the second separator 4 are in direct contact with each other so that the sealing grooves S are deeper than the gas channels G. As can also be seen from a comparison with a single cell without any electrically conductive spacer (FIG. 5A), this ensures the depth of the sealing grooves S and therefore prevents a decrease of the sealing property.

It is sufficient that the electrically conductive member 6 has a function of ensuring a certain thickness of the single cell and the electrical conduction between the first separator 3 and the second separator 4. While bumps (protrusions) or stripes may be disposed on the ribs of the corrugated plate as an electrically conductive spacer, it is preferred that the electrically conductive member 6 as a spacer is constituted by an electrically conductive plate in terms of ease of production.

Figure 6:
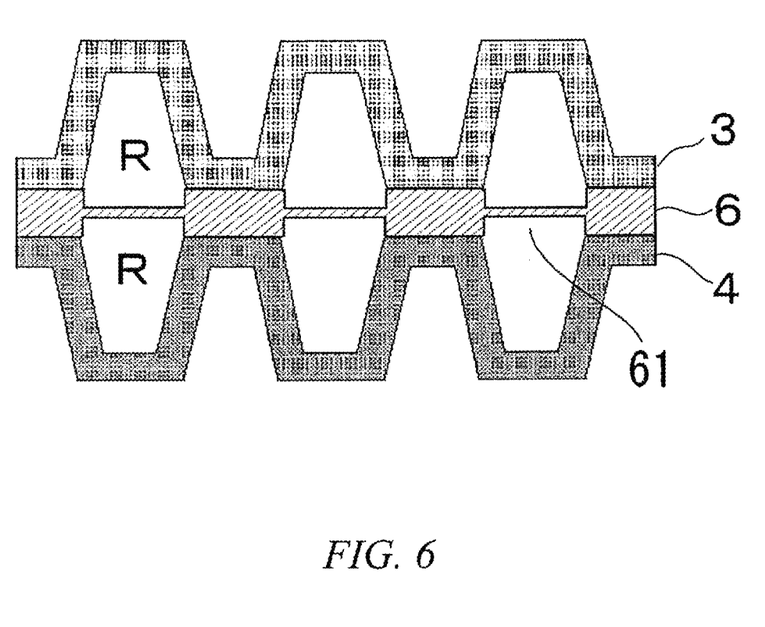
FIG. 6 is a cross sectional view illustrating an example of a state in which grooves are formed in an electrically conductive member.

The electrically conductive plate may have grooves 61 in channel portions so that the channel portions are thinner than the portions in contact with the separators as illustrated in FIG. 6. Further, the electrically conductive plate may be punched or constituted by a porous body. When the electrically conductive plate has grooves or is constituted by a porous plate, the pressure loss in the cooling medium channels can be decreased.

Figure 7:
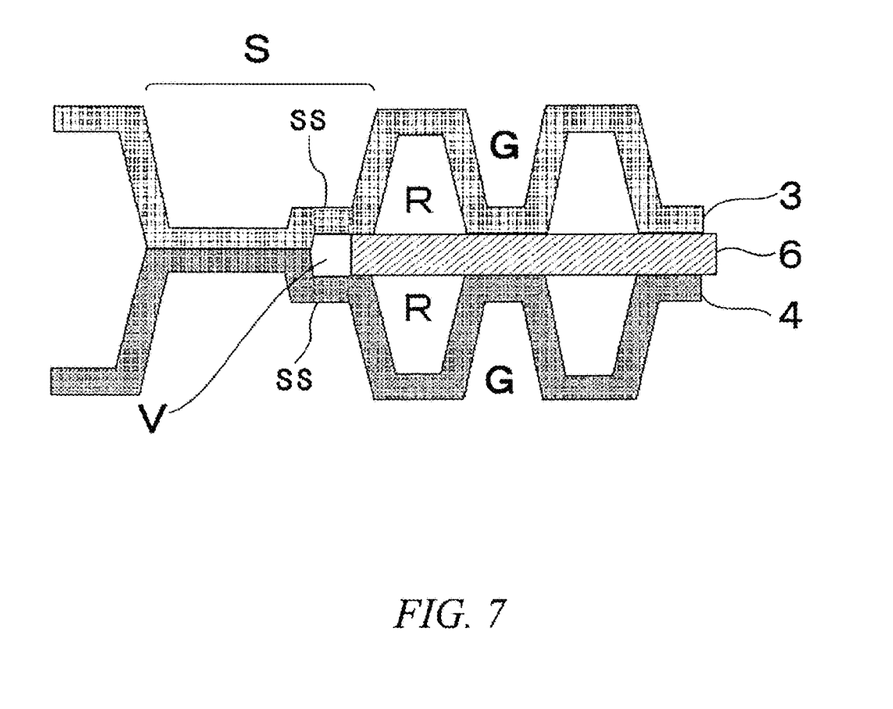
FIG. 7 is a cross sectional view illustrating a state in which an electrically conductive member extends to a sealing portion.

It is preferred that the sealing grooves S in the sealing portion, which is disposed on a periphery of the reaction area, have shallower depth parts SS at the side close to the reaction area, i.e. at the side close to the membrane electrode assembly. As illustrated in FIG. 7, the shallower depth parts SS form a gap V between the first separator 3 and the second separator 4, and the electrically conductive plate is extended to the gap V. This avoids the cooling medium channels R from being wide only at the end of the reaction area as illustrated in FIG. 5B.

As a result, all of the cooling medium channels R have the same cross sectional area, which enables equal distribution to each of the cooling medium channels R.

Figure 8:
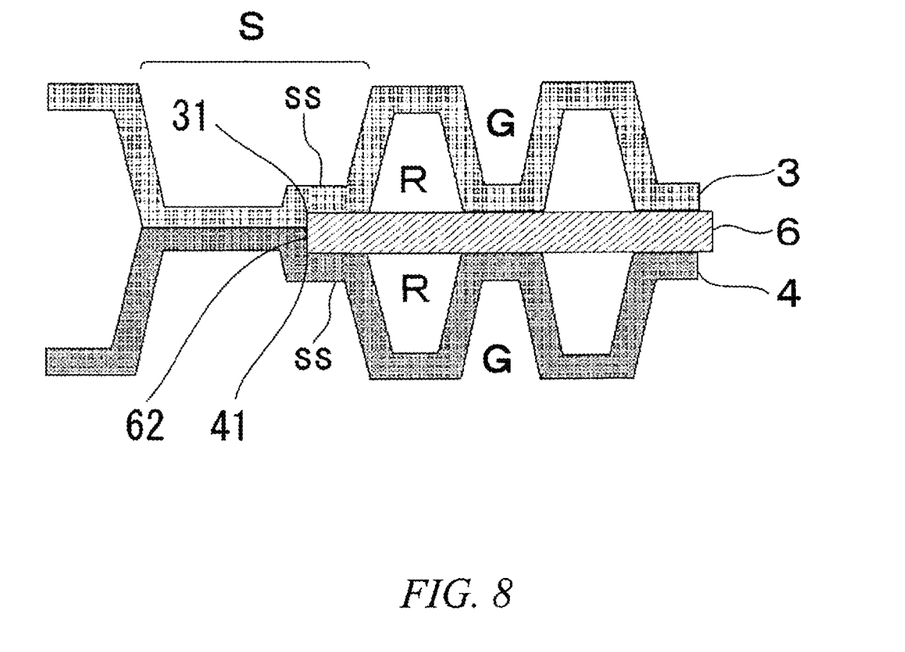
FIG. 8 is a cross sectional view illustrating a state in which positioning between an electrically conductive member and a sealing portion is made by fitting the edge.

It is preferred that the shallower depth parts SS are formed by bending the first separator 3 and the second separator 4 so that the gap has the same thickness as the electrically conductive member 6 as illustrated in FIG. 8. The bent parts 31, 41 of the separators 3, 4 may be formed to be in contact with the edge 62 of the electrically conductive plate. This facilitates positioning in the direction perpendicular to the channel direction.

Consequently, even when the shallower depth parts SS are formed in the sealing grooves S of the sealing portion, the gap V between the first separator 3 and the second separator 4 can be reduced or eliminated. Therefore, the sealing portion of the separators is not deflected even when the single cells C are stacked, pressed and restrained.

Further, the dimensional accuracy is improved, and unevenness of the space for sealing is reduced. Therefore, the sealing property is improved.

Figure 9:
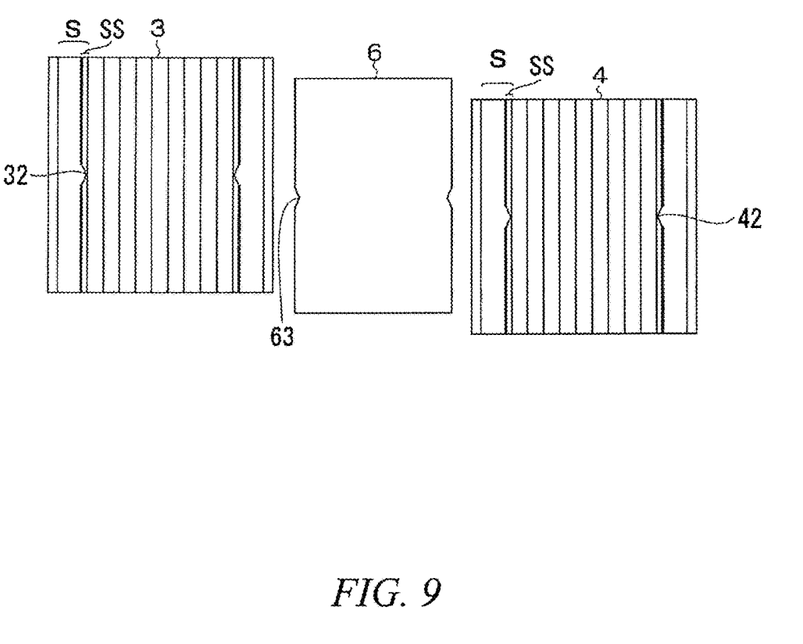
FIG. 9 is a plan view of a main part of a fuel cell metal separator structure with cutouts in an exploded state.

It is preferred that the electrically conductive member 6 has cutouts 63 that are formed partly or thoroughly on its end part in the direction approximately perpendicular to the direction of the cooling medium channels, i.e. on the sides extended to the shallower depth parts SS of the sealing grooves S. FIG. 9 is a plan view of a main part of the electrically conductive plate with the cutouts 63 and the separators 3, 4.

Fitting parts 32, 42 that fit the cutouts 63 of the electrically conductive member 6 are formed in the first separator 3 and the second separator 4 partly or thoroughly in the channel direction of the first and second separators. Fitting the cutouts 63 into the fitting parts 32, 42 facilitates positioning in the channel direction. Therefore, the sealing property is improved.

REFERENCE SIGNS LIST

1 Frame
2 Membrane electrode assembly
21 Electrolyte membrane
22 Electrode layer
23 Catalyst layer
24 Gas diffusion layer
3 First separator
31 Bent part
32 Fitting part
4 Second separator
41 Bent part
42 Fitting part
G Gas channel
S Sealing groove
SS Shallower depth part
R Cooling medium channel
V Gap
54A Current collector plate
54B Current collector plate
55 Spacer
56A End plate
56B End plate
57A Fastening plate
57B Fastening plate
58A Reinforcing plate
58B Reinforcing plate
6 Electrically conductive member
61 Groove
62 Edge of electrically conductive plate
63 Cutout
FC Fuel cell
C Single cell
L Stack

CITATION LIST

Patent Literature

Patent Document 1: JP 2011-146247A

The invention claimed is:
1. A fuel cell metal separator structure to be provided between two membrane electrode assemblies, comprising:
a first separator that is in contact with a first membrane electrode assembly of the two membrane electrode assemblies; and
a second separator that is in contact with a second membrane electrode assembly of the two membrane electrode assemblies,
wherein gas channels are formed between the first separator and the first membrane electrode assembly and between the second separator and the second membrane electrode assembly,
a cooling medium channel is formed between the first separator and the second separator, and
in a stacking direction of the first separator and the second separator and the membrane electrode assemblies,
on a periphery of the membrane electrode assemblies, the first separator and the second separator are in direct contact with each other so as to form sealing grooves,
and
in a reaction area sandwiched between the two electrode assemblies, an electrically conductive member is put between the first separator and the second separator, and both of the first separator and the second separator are in contact with the electrically conductive member.

2. The fuel cell metal separator structure according to claim 1, wherein the electrically conductive member is constituted by an electrically conductive plate.

3. The fuel cell metal separator structure according to claim 2,
wherein the sealing grooves have shallower depth parts at a side closer to the reaction area, and
the electrically conductive plate is put between the shallower depth parts of the first separator and the second separator.

4. The fuel cell metal separator structure according to claim 3,
wherein the shallower depth parts of the sealing grooves are formed by bent parts where the first separator and the second separator are bent, and
the bent parts of the first separator and the second separator are in contact with the electrically conductive plate.

5. The fuel cell metal separator structure according to claim 4,
wherein the electrically conductive plate has a cutout at its end part in a direction approximately perpendicular to a direction of the cooling medium channel, and
the cutout of the electrically conductive plate is fitted with the bent parts of the first separator and the second separator.

6. The fuel cell metal separator structure according to claim 2, wherein the electrically conductive plate is constituted by a porous body.

7. A fuel cell stack in which a fuel cell metal separator structure according to claim 1 and a membrane electrode assembly are alternately stacked.

8. A fuel cell comprising two metal separators, and a membrane electrode assembly put between the two metal separators,
wherein gas channels are formed between the membrane electrode assembly and each of the two metal separators,
cooling medium channels are formed between the metal separators and metal separators of adjacent fuel cells,
in a stacking direction of the fuel cell,
on a periphery of the membrane electrode assembly, the two metal separators are in direct contact with metal separators of respective adjacent fuel cells, so as to form sealing grooves,
and
in reaction areas sandwiching the membrane electrode assembly, electrically conductive members are put between the metal separators and metal separators of adjacent fuel cells, and
the metal separators are in contact with the electrically conductive members.

9. A fuel cell stack in which a fuel cell metal separator structure according to claim 2 and a membrane electrode assembly are alternately stacked.

10. A fuel cell stack in which a fuel cell metal separator structure according to claim 3 and a membrane electrode assembly are alternately stacked.

11. A fuel cell stack in which a fuel cell metal separator structure according to claim 4 and a membrane electrode assembly are alternately stacked.

12. A fuel cell stack in which a fuel cell metal separator structure according to claim 5 and a membrane electrode assembly are alternately stacked.

13. A fuel cell stack in which a fuel cell metal separator structure according to claim 6 and a membrane electrode assembly are alternately stacked.

* * * * *